United States Patent
Addy

(10) Patent No.: US 8,269,623 B2
(45) Date of Patent: Sep. 18, 2012

(54) METHOD AND APPARATUS FOR INTERROGATION OF A SECURITY SYSTEM

(75) Inventor: Kenneth L. Addy, Massapequa, NY (US)

(73) Assignee: Honeywell International Inc., Morristown, NJ (US)

( * ) Notice: Subject to any disclaimer, the term of this patent is extended or adjusted under 35 U.S.C. 154(b) by 308 days.

(21) Appl. No.: 12/560,200

(22) Filed: Sep. 15, 2009

(65) Prior Publication Data

US 2010/0245073 A1   Sep. 30, 2010

Related U.S. Application Data

(60) Provisional application No. 61/163,251, filed on Mar. 25, 2009.

(51) Int. Cl.
*G08B 1/08* (2006.01)

(52) U.S. Cl. .................................................. 340/539.1

(58) Field of Classification Search .............. 340/539.1, 340/505, 506, 539.14, 539.16, 541, 539.26, 340/572.1
See application file for complete search history.

(56) References Cited

U.S. PATENT DOCUMENTS

| | | | |
|---|---|---|---|
| 5,650,940 A * | 7/1997 | Tonozuka et al. | 709/224 |
| 6,057,764 A * | 5/2000 | Williams | 340/572.1 |
| 6,377,589 B1 * | 4/2002 | Knight et al. | 370/524 |
| 2007/0157018 A1 * | 7/2007 | Simon et al. | 713/100 |
| 2007/0164847 A1 * | 7/2007 | Crawford et al. | 340/5.61 |

* cited by examiner

*Primary Examiner* — Phung Nguyen
(74) *Attorney, Agent, or Firm* — Husch Blackwell

(57) ABSTRACT

A method and apparatus are provided for obtaining the status of a security system. The method includes the steps of providing a security system for a protected premises, coupling the security system to a central monitoring station through a short-range radio and a broadband connection that receives polling messages from the protected premises where the broadband connection forwards the polling message to the central station, the central station receiving a status request from an authorized user of the protected premises, in response to the polling message, the central station transmitting the status request to the security system through the broadband connection and short range radio system and the security system transmitting a status report through the short range radio and the broadband connection to the central monitoring station in response to the request.

17 Claims, 4 Drawing Sheets

METHOD AND APPARATUS FOR INTERROGATION OF A SECURITY SYSTEM

This application is a continuation-in-part of U.S. Provisional Patent Application No. 61/163,251 filed on Mar. 25, 2009.

FIELD OF THE INVENTION

The invention relates to security systems and more particularly to security systems that rely upon central station monitoring.

BACKGROUND OF THE INVENTION

Security systems for protected premises such as homes or businesses are generally known. Such systems typically include a number of intrusion detectors coupled to an alarm panel. The intrusion detectors may be window or door switches disposed around a perimeter of the protected premises and motion detectors within the protected premises.

The alarm panel is typically provided with a control panel near a premises entrance where an authorized user of the premises may arm and disarm the security system. The alarm panel is typically also provided with an audible alarm to alert authorized occupants of the protected space to the presence of intruders.

A local alarm panel may also be connected to a central monitoring station. In the event of an alarm, the local alarm panel may automatically report the alarm to the central station. The central station, in turn, may report the alarm to the police.

The connection between the local security panel and central station may be established by a wireline through a public switch telephone network (PSTN) or by a cellular transceiver operating through a local cellular telephone network. However, wireline connections could be disabled by a burglar.

On the other hand, while the use of a cellphone system is relatively effective in reporting alarms, there are limits on the use of the cellphone system by alarm systems. Such use is typically limited to reporting alarm events or to a very limited number of status events. Because of the importance of alarms and alarm status information, a need exists for better methods for obtain status information from local premises alarm systems.

BRIEF DESCRIPTION OF THE INVENTION

DETAILED DESCRIPTION OF AN ILLUSTRATED EMBODIMENT

Figure 1:
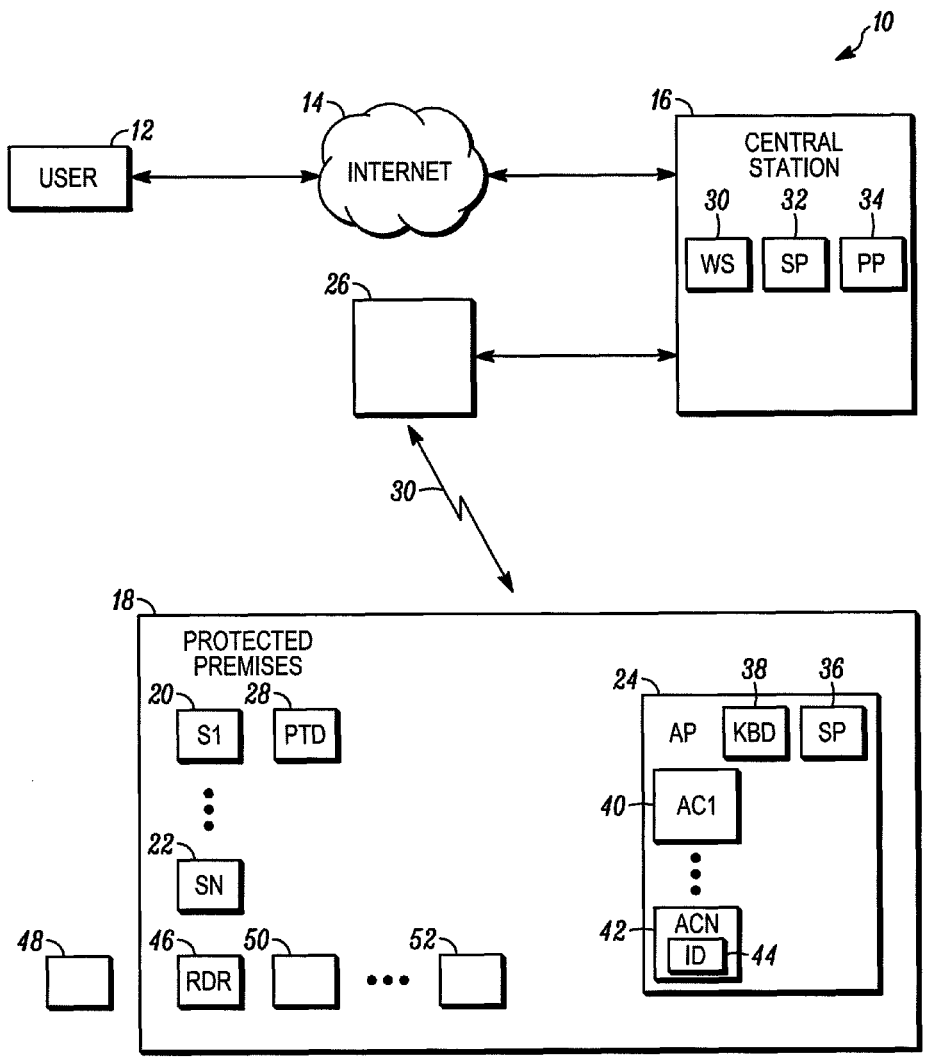
FIG. 1 is a block diagram of a security system in accordance with an illustrated embodiment of the invention.

FIG. 1 is a block diagram of an alarm system 10 shown generally in accordance with an illustrated embodiment of the invention. Included within the alarm system 10 is a protected premises 18 and a central monitoring station 16. A local security system within the protected premises 18 may include a number of intrusion sensors 20, 22 connected to the alarm panel 24.

As shown in FIG. 1, the alarm panel 24 is coupled to a central monitoring station 16 via a broadband cellular connection (e.g., general packet radio service (GPRS), local area network/wide area network (LAN/WAN), etc.) 30. In this regard, a wireless premises transceiver 28 may exchange packets with the central station 16 via a transceiver 26 located within a local cellular network. The local cellular network, in turn, operates to forward packets from the alarm panel 24 to the central station 16 and packets from the central station 16 to the alarm panel 24.

Under the illustrated embodiment, an authorized user (e.g., owner, renter, authorized person, etc.) of the premises 18 may arm and disarm the local security system via a code entered through a keypad 38 located on or near the alarm panel 24. Once armed, the alarm panel 24 may monitor the sensors 20, 22 for intruders. If a sensor 20, 22 is activated indicating an intrusion, the alarm panel 24 may report the intrusion immediately or (depending upon the sensor 20, 22 activated), the alarm panel 24 may wait a predetermined time for entry of a disarm code through the keyboard 38.

Under the illustrated embodiment, an authorized user of the premises 18 may carry a portable electronic device (e.g., iPhone, Backberry, etc.) 12 that allows access to status information regarding the premises 18 through the Internet 14 and the central station 16. Alternatively, the authorized user may obtain status information from any terminal 12 coupled to the central station 16 through the Internet 14. The status reports could include information about alarm events, but could also be directed to events that are not related to or reported as alarms.

For example, the authorized user working at a terminal 12 may identify any of a number of ancillary events occurring within the premises 18 and may specify an action to be taken in response to the occurrence of the event. As used herein, an ancillary event is an event that is ancillary to the purpose of the alarm system and would not in itself cause an alarm to be transmitted to the central station 16. For example, an ancillary event may be the detection of an access code used to disarm the security system.

For example, the premises 18 may be the residence of a family including children. In this case, an authorized user (e.g., a working parent) may want to be notified when a child (e.g., returning home from school) arrives at the residence 18. In this case, the parent may send a status inquiry to the central station 16 that requests a status report each time the disarm code is entered through the alarm panel 24.

Moreover, the family could assign a different disarm code to each different child in the family. In this case, the parent could request a status report each time a child's code is entered through the alarm panel. Alternatively, the parent may only request a report only if one particular child (e.g., the youngest child) has returned home and has entered his/her particular code through the panel 24.

Figure 2:
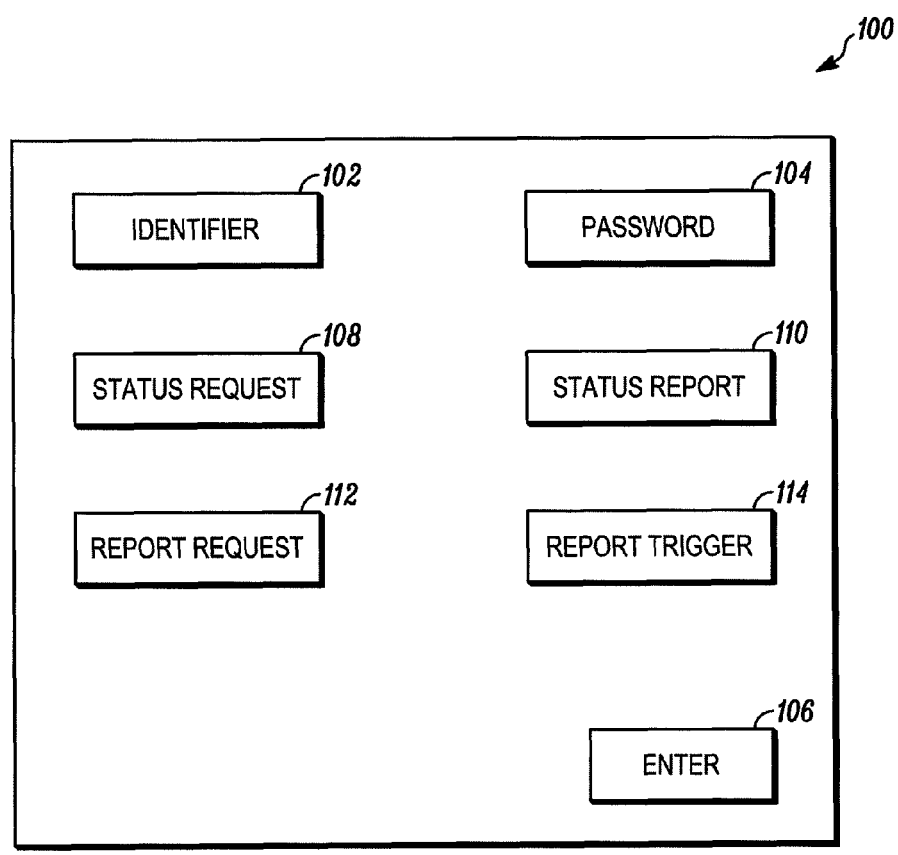
FIG. 2 depicts a web page that may be used by the system of FIG. 1.

To request status reports, the authorized user may activate a browser within the terminal 12 and access the central monitoring station 16 through the Internet 14. In this case, the user may enter a URL of a website 30 of the central station 16 and download a status webpage (e.g., the webpage 100 shown in FIG. 2).

Upon receiving the webpage 100, the user may be required to enter an identifier (e.g., name, address, account number, etc.) through a first interactive window 102 and a password through a second interactive window 104. Once the user has entered a name and password, the user may activate an ENTER softkey 106 to log into the central station 16. Within the central station, a password processor 34 may compare the name and password with a set of authorized users and grant access if the name and password matches an entry within the set of authorized users.

Once access to the central station 16 have been obtained, the user may activate a status request softkey 108. In response, a status processor 32 within the central station 16 waits for the next polling message from the premises transceiver 28. Upon receipt of the polling message, the status processor 32 may compose a status request packet and forward the packet through the broadband connection 30, and premises transceiver 28 to the alarm panel 24. Within the alarm panel 24, a corresponding status processor 36 receives the status request packet and composes a status report. The status report may indicate an alarm panel status (e.g., armed or disarmed). The status report may also provide a status of each of the sensors 20, 22. The connection between the premises transceiver 28, and alarm panel 24 is a short range radio frequency connection which operates under the rules of FCC part 15, which restricts the on-air time of the link.

The alarm panel processor 36 may forward the report to the central monitoring station 16. Within the central station 16, the status report is forwarded to the terminal 12, where the status report 110 is displayed to the user.

Each time that the user activates the status softkey 108, the central station 16 forwards a status request to the alarm panel 18 upon receipt of the next polling message from premises transceiver 28 and the alarm panel 24 responds.

Figure 3:
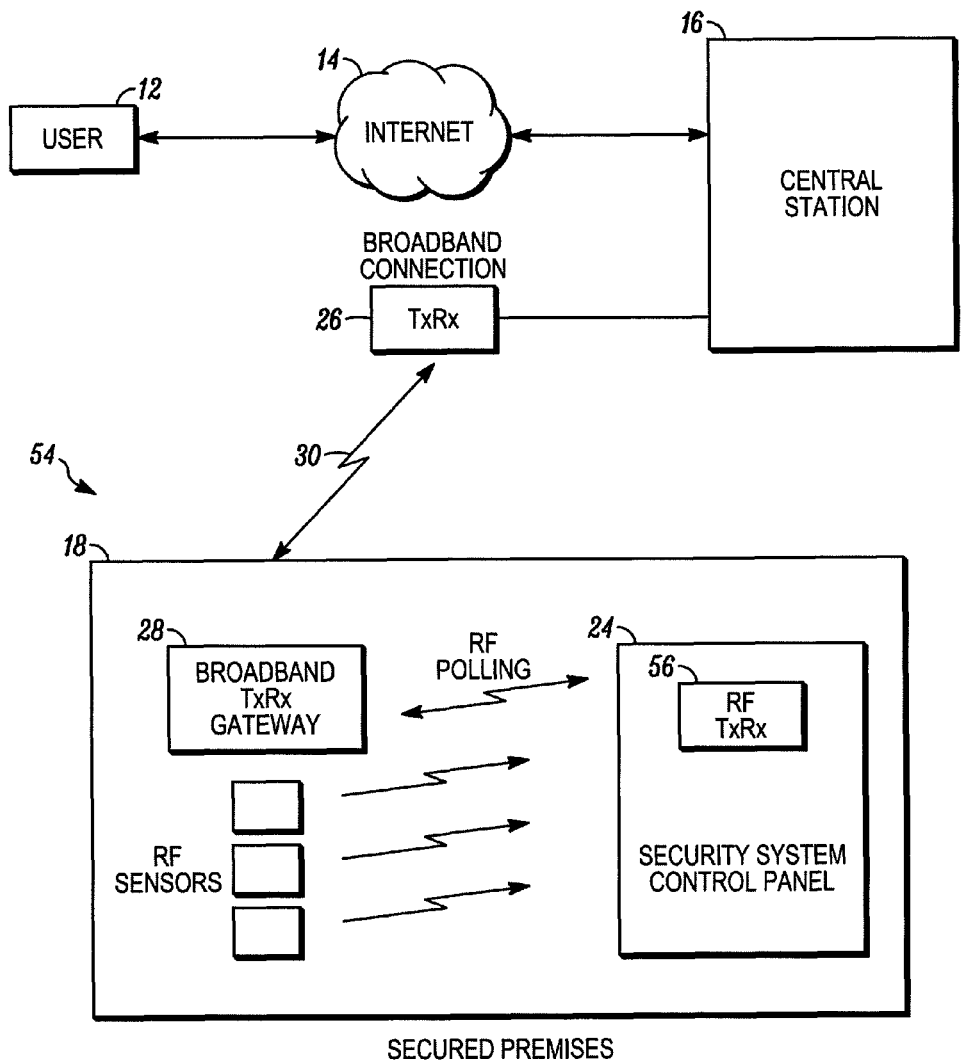
FIG. 3 is a simplified block diagram showing a short range radio system located within the secured premises used by the system of FIG. 1.

In general, the user requires a very low latency, real time, indication of security system status through a PDA or web browser 12. The connection may be achieved as follows (see FIG. 3). As a first step, the user sends a status request to the central station 16. The central station 16 forwards the packet to the secured premises 18 upon receipt of the next polling message via a broadband connection 30 to a transceiver/gateway 28 that connects to the security system 24 via a short range radio system (including transceivers 28, 56) located on site. This short range radio system must be compliant with FCC Rule 15.231(a)(3).

In response to receipt of the packet, the transceiver/gateway 28 polls the security system short range radio transceiver 56 for system status. The security system short range transceiver 56 is located within or connected to the alarm panel 24 and therefore knows the system status at all times.

Because of the restrictions of FCC Rule 15.231(a)(3), the transceiver/gateway 28 cannot poll the security system short range radio transceiver 56 too often or the on-air time will exceed FCC Rule 15.231(a)(3).

Since the broadband gateway in the secured premises 18 is 1) not connected to the central station 16 through an "always on" connection and 2) the gateway 28 in the secured premises 18 may include or be behind a firewall or operating with a dynamic IP address, the communication between the secured premises 18 and the central station 16 is initiated by the gateway 28 in the premises, the polling message from the transceiver/gateway 28 includes the dynamic IP address of the gateway 28.

Since the goal is to reduce the number and periodicity of the polls by the "RF Polling" of the short range radio 56, while still ensuring low latency responses to inquiries from a remote user's device 12, the short range radio RF polling is suppressed to less than the predetermined time period required by FCC Rule 15.231(a)(3) until an inquiry from the central station 16 is received over the broadband connection 30 in response to the polling message from the gateway 28. In this case, the inquiry indicates that an end-user needs to make a connection in order to view system status.

Figure 4:
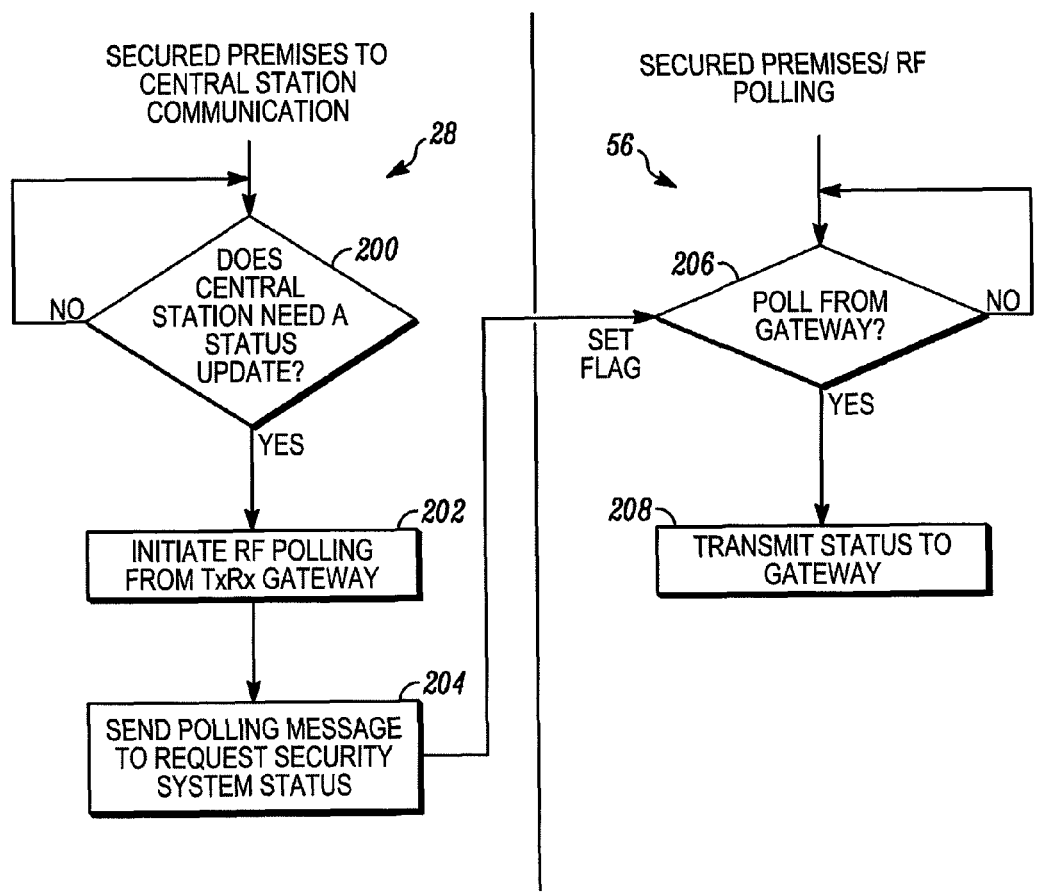
FIG. 4 is a flow chart of steps followed by the radio system within the secured premises.

If an end-user needs a remote status update, then the short range radio RF polling in the secured premises 18 operates as shown in FIG. 4. In this regard, the transceiver/gateway 28 is continuously, periodically polling the central station over the WAN to determine whether the end user (who in turn is connected via central station 16) needs an update. If an update is required, then gateway 28 by monitoring 200, the connection 30, for requests for status updates decides whether it is necessary to initiate communication over the short range radio system within the protected premises. In response to the status request, the short range radio system initiates 202 a short range radio polling message through the transceiver/gateway 28. and forwards 204 the short range radio polling message to the radio transceiver 56. The transceiver 56 may now respond immediately to the polling message since it was manually initiated and therefore not subject to the restrictions of FCC part 15 on the on-air time of the short range radio system.

Within the alarm panel 24, a monitoring process within the status processor 36 monitors 206 the transceiver 56 for short range radio polling messages. When a short range radio polling message is received, the status processor transmits 208 a status message (response) to the central station 16 via the short range radio system and gateway 28.

In addition to the user transmitting status inquires, the user may also request a status request based upon a predetermined event such as the entry of a deactivation code through a keyboard 38 of the alarm panel 24. In this case, the authorized user working through the terminal 12 may enter a particular deactivation code desired through a first report trigger window 114 (FIG. 2) and activate a report request softkey 112.

In response, the status processor 32 composes a status request packet and forwards the request packet through the broadband connection 30 to the alarm panel status processor 36 in response to the next polling message. However, the status request packet now has a specific condition associated with the request (i.e., entry of a specific alarm access code). As such, the status processor 36 takes no immediate action other than to monitor the keyboard 38 for entry of access codes.

Upon entry of an access code through the keyboard 38, a comparator within the status processor 36 compares the entered access code with one or more access codes 40, 42 saved within the alarm panel 24. When the alarm panel 24 has only one access code and the status processor 36 determines that a match exists between the entered access code and the saved code, then the status processor 36 sends a status report through the central station 16 to the terminal 12 of the user in real-time. In this case, the status report notifies the authorized user that someone has entered the proper access code to enter the protected premises 18.

In another embodiment, a respective access code 40, 42 is assigned to each of a number of different persons to be given access to the protected premises 18 by the authorized user. Included with each of the saved access codes 40, 42 is an identifier (e.g., a name, photograph, etc.) 44. Upon entry of the proper access code, the status processor 36 may include the identifier of the authorized person within the status report for display on the terminal 12 of the authorized user. In the case of a parent with many different children, the parent may then know who came home and when.

In another embodiment, the persons to be given access to the protected premises 18 may be given radio frequency identifier (RFID) tags 48. In this case, any time that the RFID tag 48 is brought into proximity of a reader 46, the access code within the tag 48 is read by the reader 46. This may be especially useful where the persons to be give access are young children who may not be able to successfully remember to enter an access code. In this case, the RFID tag 48 may be worn around the neck of the child and may then be read by the reader 46 whenever the child enters the protected premises. As above, the return of the child to the home 18 would be reported in real time to the parent through the terminal 12. It should be noted in this regard, that the status report including the identifier of the person carrying the RFID tag 48 may be sent to the authorized user whether the alarm panel 24 was armed on not armed.

In another embodiment, a randomizing event, at the protected premises 16 could cause the generation of a status report. This would ensure that the polling is randomized and not subject to FCC Rule 15.231(a)(3). This could be used to ensure that the gateway 28 has the latest status information from the alarm panel 24.

For example, one or more benign sensors (e.g., temperature, humidity, noise, etc.) 50, 52 may be used to trigger a status report. A benign sensor in this case means a sensor that is again ancillary to the purpose of the alarm and would not include sensors that detect fire, water or natural gas. To limit the transmission of reports to a reasonable rate for any particular time period, a timer may be logically ANDed with the environmental sensor 50, 52. In this case, triggering and re-triggering of the benign sensor would only cause real-time transmission of the status request/report when the benign sensor is activated and a predetermined time period has elapsed since the last status report.

A specific embodiment of method and apparatus for providing status information has been described for the purpose of illustrating the manner in which the invention is made and used. It should be understood that the implementation of other variations and modifications of the invention and its various aspects will be apparent to one skilled in the art, and that the invention is not limited to the specific embodiments described. Therefore, it is contemplated to cover the present invention and any and all modifications, variations, or equivalents that fall within the true spirit and scope of the basic underlying principles disclosed and claimed herein.

The invention claimed is:

1. A method comprising:
 providing a security system for a protected premises;
 coupling the security system to a central monitoring station through a short range wireless connection that operates below a predetermined duty cycle;
 the central monitoring station receiving a status request from an authorized user of the protected premises;
 in response to a polling message from the protected premises, the central monitoring station transmitting the status request to the security system through the short range wireless connection;
 the security system transmitting a real-time status report through the short range wireless connection to the central monitoring station in response to the request; and
 the security system transmitting an identifier of an identified person to the central station.

2. The method as in claim 1 further comprising the security system delaying transmission of the status report until the occurrence of a predetermined event.

3. The method as in claim 2 further comprising defining the predetermined event as receipt of a code by the security system of a person designated by the authorized user.

4. The method as in claim 2 further comprising defining the predetermined event as a benign environmental condition within the protected premises.

5. The method as in claim 3 further comprising comparing the received code with a plurality of codes of authorized persons to identify the person.

6. The method as in claim 3 further comprising the security system determining an identity of the person from the code.

7. The method as in claim 1 further comprising the central monitoring station forwarding the identifier to the authorized user.

8. The method as in claim 1 further comprising defining the short range wireless connection as being compliant with FCC part 15.231.

9. An apparatus comprising:
 a security system for a protected premises;
 a central monitoring station coupled to the security system through a wireless short range connection where the wireless short range connection operates below a predetermined duty cycle;
 a status request received by the central monitoring station from an authorized user of the protected premises, the status request being sent to the security system through the wireless short range connection in response to a polling message from the protected premises; and
 a real-time status report transmitted from the security system through the wireless short range connection to the central monitoring station in response to the request, wherein the real-time status report includes an identifier of an identified person.

10. The apparatus as in claim 9 further comprising a timer within the security system that delays transmission of the real-time status report until the occurrence of a predetermined event.

11. The apparatus as in claim 10 wherein the predetermined event further comprises an access code received by the security system of a person designated by the authorized user.

12. The apparatus as in claim 11 further comprising a comparator that compares the received code with a plurality of codes of authorized persons to identify the person.

13. The apparatus as in claim 11 further comprising an identity of the person determined by the security system from the code.

14. The apparatus as in claim 9 further comprising a short range radio system that is compliant with FCC part 15.231.

15. An apparatus comprising:
 a security system for a protected premises;
 means for coupling the security system to a central monitoring station through a wireless short range connection that that operates below a predetermined duty cycle;
 means within the central monitoring station for receiving the polling message from the security system;
 means within the central monitoring station for receiving a status request from an authorized user of the protected premises;
 means within the central monitoring station for transmitting the status request to the security system through the wireless short range connection in response to the polling message; and
 means within the security system for transmitting a real-time status report through the wireless short range radio connection to the central monitoring station in response to the request, wherein the real-time status report includes an identifier of an identified person.

16. The apparatus as in claim 15 further comprising means within the security system for delaying transmission of the real-time status report until the occurrence of a predetermined event.

17. The apparatus as in claim 16 further comprising means for defining the predetermined event as receipt of a code by the security system of a person designated by the authorized user.

* * * * *